(12) United States Patent
Teo et al.

(10) Patent No.: US 7,695,199 B2
(45) Date of Patent: Apr. 13, 2010

(54) OPTICAL SUBASSEMBLY HAVING INSERTABLE CYLINDRICAL SLEEVE

(75) Inventors: Tat Ming Teo, Compassvale Link (SG); Chris Kiyoshi Togami, San Jose, CA (US); Jinxiang Liu, Bukit Batok (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/458,948

(22) Filed: Jul. 20, 2006

(65) Prior Publication Data
US 2008/0019643 A1    Jan. 24, 2008

(51) Int. Cl.
G02B 6/36    (2006.01)
G02B 6/38    (2006.01)

(52) U.S. Cl. .............................. 385/78; 385/60; 385/72; 385/85; 385/92

(58) Field of Classification Search .................... 385/60, 385/72, 78, 85, 92–94
See application file for complete search history.

(56) References Cited
U.S. PATENT DOCUMENTS 5,337,390 A * 8/1994 Henson et al. ................. 385/81
5,971,626 A * 10/1999 Knodell et al. ................ 385/60
6,071,017 A * 6/2000 Gilliland et al. ............... 385/93
2007/0147744 A1* 6/2007 Dunn et al. .................... 385/88

\* cited by examiner

Primary Examiner—Charlie Peng
(74) Attorney, Agent, or Firm—Workman Nydegger

(57) ABSTRACT

An optical subassembly ("OSA") for use in optical communications modules is disclosed. The OSA solves various issues related to the insertion and removal of an optical fiber connector into and from the OSA receptacle, including hard plug, wiggle performance, and shavings production. In one embodiment, an optical communications module is disclosed and includes a housing and an optical subassembly of the present invention partially contained within the housing. The optical subassembly includes various components, including a body composed of a first material, and a plug receptacle formed with the body. The plug receptacle includes an inner surface on which surface features, such as threads, are formed. A hollow cylindrical sleeve composed of a second material is received in the plug receptacle such that the outer sleeve surface engages the surface features of the plug receptacle inner surface and such that an optical fiber connector can be received by the sleeve.

15 Claims, 8 Drawing Sheets

OPTICAL SUBASSEMBLY HAVING INSERTABLE CYLINDRICAL SLEEVE

BACKGROUND

1. Technology Field

The present invention generally relates to optical transmitters and receivers. In particular, the present invention relates to an optical subassembly that is configured to eliminate problems relating to hard plugging, fiber wiggle, and shavings when connecting with an optical fiber.

2. The Related Technology

Optical transceivers are used to transmit and receive optical signals from an optical network and to enable electrical network components to interface with and communicate over optical networks. Many optical transceivers are modular and are designed in accordance with industry standards that define mechanical aspects of the transceivers, form factors, optical and electrical requirements, and other characteristics and requirements of the transceivers. For example the Small Form-Factor Module Multi-Source Agreement ("SFF MSA"), the Small Form-Factor Pluggable Module Multi-Source Agreement ("SFP MSA") and the 10 Gigabit Small Form Factor Pluggable Module Multi-Source Agreement ("XFP MSA") Revision 3.1 define such standards.

The basic optical components of conventional transceivers include a transmitter optical sub-assembly ("TOSA") and a receiver optical sub-assembly ("ROSA"). The TOSA receives electrical signals from a host device via circuitry of the transceiver module and generates a corresponding optical signal that is then transmitted to a remote node in an optical network. Conversely, the ROSA receives an incoming optical signal and outputs a corresponding electrical signal that can then be used or processed by the host device. Additionally, most transceivers include a rigid printed circuit board ("PCB") containing, among other things, control circuitry for the TOSA and ROSA.

The TOSA and ROSA are each connected to the optical network via optical fibers that are capable of transmitting optical signals. Each optical fiber includes a connector that mates with a corresponding port defined in the respective TOSA or ROSA.

Various challenges have been known to arise when connecting connector-equipped optical fibers with TOSA and ROSA ports. One of these challenges is referred to "hard plug," a condition in which difficulty is encountered when attempting to insert or remove the optical fiber connector to and from the port. This condition can be caused by several factors, including the port being formed of a material, such as zinc or aluminum, that are relatively soft when compared to the connector material, which can cause deformation of the relatively softer port material when the connector is repeatedly inserted and removed from the port. Other port materials, such as nickel may migrate while the connector is plugged into the TOSA or ROSA port, which can also cause hard plug.

To alleviate hard plug problems, some OSA port designs have employed a split sleeve that is inserted into the port to define the contact surface for the port when the optical fiber connector is inserted therein. The sleeve is longitudinally split along its length so that it flexes slightly when the optical fiber connector is inserted into or removed from the port, thereby reducing hard plug. Such port designs, however, are also known to poorly perform when subjected to a "wiggle" test, wherein the optical fiber is grasped and wiggled while its connector is received within the TOSA or ROSA port and variance in the optical coupling and optical power between the fiber and the TOSA or ROSA is measured. Because of its tendency to flex, the OSA port having a split sleeve design enables substantial movement of the connector within the port. This, in turn, can significantly reduce the optical power transmitted between the optical fiber and the TOSA/ROSA. As many vendors require certain levels of wiggle performance, problems in this area can represent a serious problem for manufacturers. Moreover, it is noted that split sleeve portion designs often require the insertion of a fiber plug therein, thereby necessitating further process steps and assembly cost.

In yet another attempt to solve hard plug issues, the optical subassembly body that defines the port has been manufactured out of relatively hard materials that will not deform or otherwise be compromised when connector insertion or removal is performed. However, manufacture of an optical subassembly from such materials is relatively expensive, both in terms of the cost of the materials and the process needed to manufacture the part. In the current competitive environment where costs are constantly being driven downward, such solutions quickly become untenable.

Other problems can arise with materials and designs previously used for TOSA and ROSA port configurations. These problems include the production of shavings from the port surface when the connector is inserted, and corrosion of the port material due to high iron content. Also, many of the above configurations require labor intensive procedures to prepare the optical subassembly and the port, including precision machining and boring, plating, repetitive process steps, etc.

In light of the above discussion, a need exists in the art for an optical subassembly that includes a port for operably connecting the connector of an optical fiber. Moreover, a need exists for an optical subassembly port that does not suffer from hard plug upon either insertion or removal of the optical fiber connector into or form the port. Any solution should also exhibit acceptable wiggle performance, reduce the incidence of shaving production within the port, and should reduce overall costs of subassembly production.

BRIEF SUMMARY

The present invention has been developed in response to the above and other needs in the art. Briefly summarized, embodiments of the present invention are directed to an optical subassembly ("OSA") for use in optical communications modules. The OSA solves various issues related to the insertion and removal of an optical fiber connector into and from the OSA receptacle, including hard plug, wiggle performance, and shavings production.

In one embodiment, an optical communications module is disclosed and includes a housing and an optical subassembly of the present invention partially contained within the housing. The optical subassembly includes various components, including a body composed of a first material, and a plug receptacle formed with the body. The plug receptacle includes an inner surface on which surface features, such as threads, are formed. A hollow cylindrical sleeve composed of a second material is received in the plug receptacle such that the outer sleeve surface engages the surface features of the plug receptacle inner surface and such that an optical fiber connector can be received by the sleeve.

The OSA body is composed of a relatively soft material, which enables it to be formed and machined at a low cost. In contrast, the sleeve is composed of a relatively hard material, such as zirconium or glass ceramic, which matches the hardness of the optical fiber connector material. Thus, the sleeve resists deformation or metal migration, two prevalent causes of the hard plug problems described above. Also, because of its hardness and the fact that it is not a split sleeve, the OSA sleeve improves wiggle performance by restricting movement of the connector when wiggled while received in the sleeve. Further, zirconium or other acceptable hard materials desirably reduce the production of shavings during connector insertion or removal.

In particular, the sleeve serves as the contact surface when the optical fiber connector is received in the plug receptacle. As such, it protects the softer material of the rest of the plug receptacle by absorbing the frictional forces associated with connector insertion and removal. Thus, forming the OSA body and plug receptacle out a cheaper, softer material does not impact the quality or function of the OSA.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-7 depict various features of embodiments of the present invention, which are generally directed to an optical subassembly for use in optical transmitters and receivers, such as those found in an optical transceiver module. The optical subassembly includes a port configured for receiving a connector of an optical fiber. The port includes a receptacle defined by the optical subassembly housing, and a hollow cylindrical sleeve that is press fit in the receptacle. This port configuration substantially eliminates challenges previously encountered in the art, including hard plug, wiggle performance, and shaving production. Further, the present optical subassembly reduces overall part count when compared with known designs, and reduces cost of production, as will be described herein.

In the exemplary embodiments to follow, the optical subassembly is implemented as a transmitter optical subassembly ("TOSA") or a receiver optical subassembly ("ROSA") of an optical transceiver module ("transceiver"). The TOSA and ROSA include various components to enable the reception and transmission of optical signals to and from a host system that is operably connected to the transceiver. Though not shown, the host system can be included as a node in a communications network, for instance, and can employ the transceiver in communicating via optical signals with other components of the network. Note, however, that the discussion to follow regarding embodiments of the present invention should not be construed as a limiting of the application to such embodiments. Indeed, devices and components apart from transceivers that employ optical subassemblies can also benefit from the teachings to be discussed herein.

1. Exemplary Operating Environment

Figure 1:
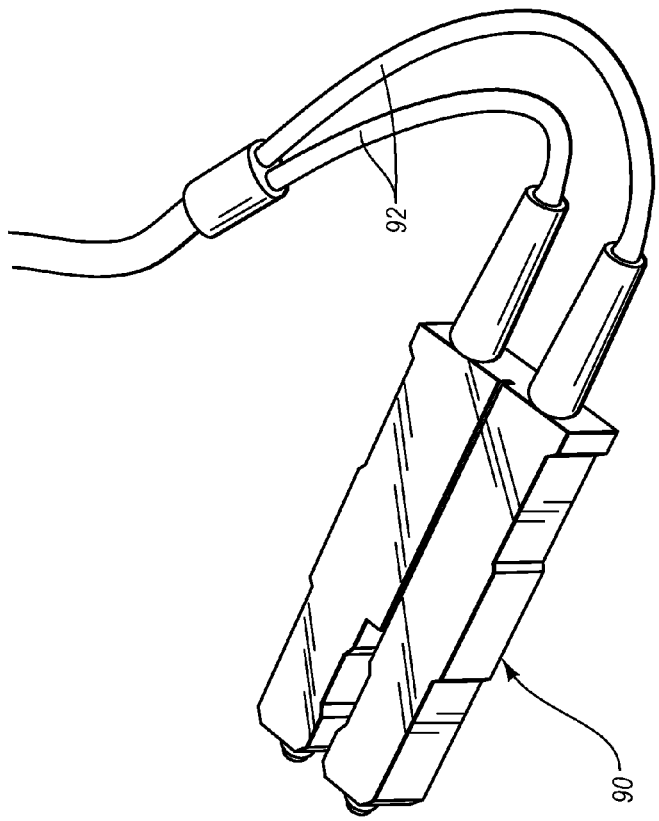
FIG. 1 is shows various details regarding an optical transceiver module, which serves one exemplary environment in which embodiments of the present invention can be practiced.
Figure 1:
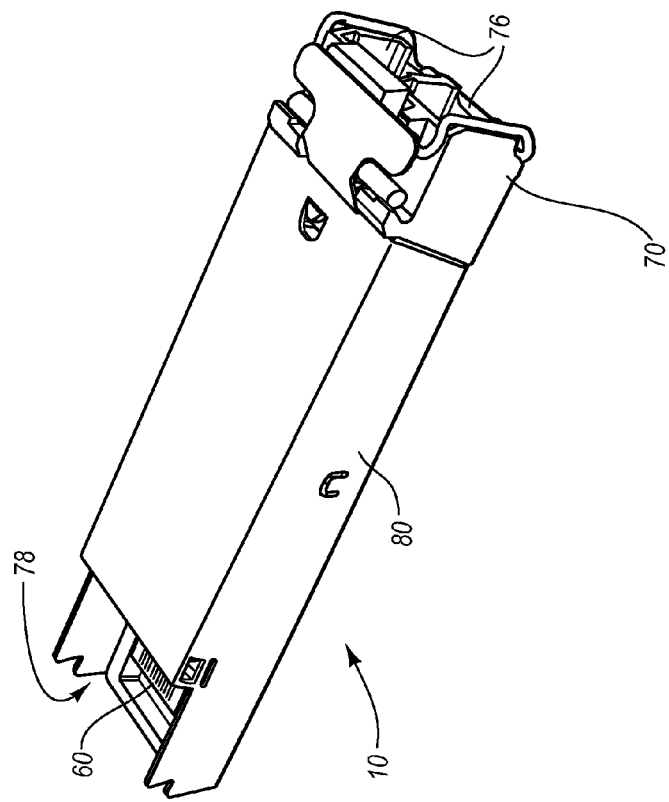

Reference is first made to FIG. 1, which depicts a perspective view of an optical transceiver module ("transceiver"), generally designated at 10, for use in transmitting and receiving optical signals in connection with an external host that is operatively connected in one embodiment to a communications network (not shown). Though not explicitly shown here, the transceiver 10 includes various components, including a receiver optical subassembly ("ROSA"), a transmitter optical subassembly ("TOSA"), electrical interfaces, various electronic components, and a printed circuit board ("PCB"). In detail, two electrical interfaces are included in the transceiver 10, one each used to electrically connect the ROSA and the TOSA to a plurality of conductive pads located on the PCB. The electronic components are also operably attached to the PCB. An edge connector 60 is located on an end of the PCB to enable the transceiver 10 to electrically interface with a host (not shown). As such, the PCB facilitates electrical communication between the ROSA/TOSA, and the host.

As shown, the above-mentioned components of the transceiver 10 are partially housed within a shell 70. The shell 70 cooperates with a housing 80 to define a covering for the components of the transceiver 10. The shell 70 further defines two ports 76 to enable operable connection between the TOSA and ROSA and an optical fiber connector 90 positioned at the end of two optical fibers 92. In this way, operable communication between the transceiver 10 and a communications network can be achieved via the optical fibers 92.

While depicting various of its physical and operational aspects herein, it is appreciated that the transceiver 10 is described by way of illustration only, and not by way of restricting the scope of the invention. Thus as mentioned above, the transceiver 10 in one embodiment is suitable for optical signal transmission and reception at a variety of per-second data rates, including but not limited to 1 Gbit, 2 Gbit, 4 Gbit, 8 Gbit, 10 Gbit, or higher bandwidth fiber optic links. Furthermore, the principles of the present invention can be implemented in optical transceivers of any form factor such as XFP, SFP and SFF, without restriction. In particular, one embodiment of the present invention is disclosed in connection with use in an Gigabit interface converter ("GBIC")-type transceiver.

In operation, the transceiver 10 receives an optical signal from the respective optical fiber 92 that is operably connected to the ROSA via the port 76. The ROSA acts as an optoelectric transducer by transforming the received optical signal into an electrical signal. The transceiver 10 may also receive electrical signals from the host for transmission onto the optical fiber 92 that is operably connected to the TOSA via the port 76. Specifically, an electrical signal can be received by the TOSA from the host via the PCB edge connector 60. Various circuitry on the PCB and within the TOSA itself drives a laser within the TOSA, which causes the laser to emit onto the respective optical fiber 92 optical signals representative of the information in the electrical signal provided by the host. Accordingly, the TOSA serves as an electro-optic transducer.

Having described a specific environment with respect to FIG. 1, it will be understood that this specific environment is only one of countless architectures in which the principles of the present invention may be employed. As previously stated, the principles of the present invention are not intended to be limited to any particular environment.

2. Structural and Functional Aspects of an Optical Subassembly with Cylindrical Sleeve Together with FIG. 1, reference is now made to FIG. 2. In general, the operating environment described above, including the transceiver 10, is exemplary of one environment in which an optical subassembly produced according to principles of the present invention can be employed. In particular, embodiments of the present invention disclose an optical subassembly that substantially eliminates challenges previously encountered in the art, including hard plug, wiggle performance, and shaving production. Further, the present optical subassembly reduces overall part count when compared with known designs, and reduces cost of production.

Figure 2:
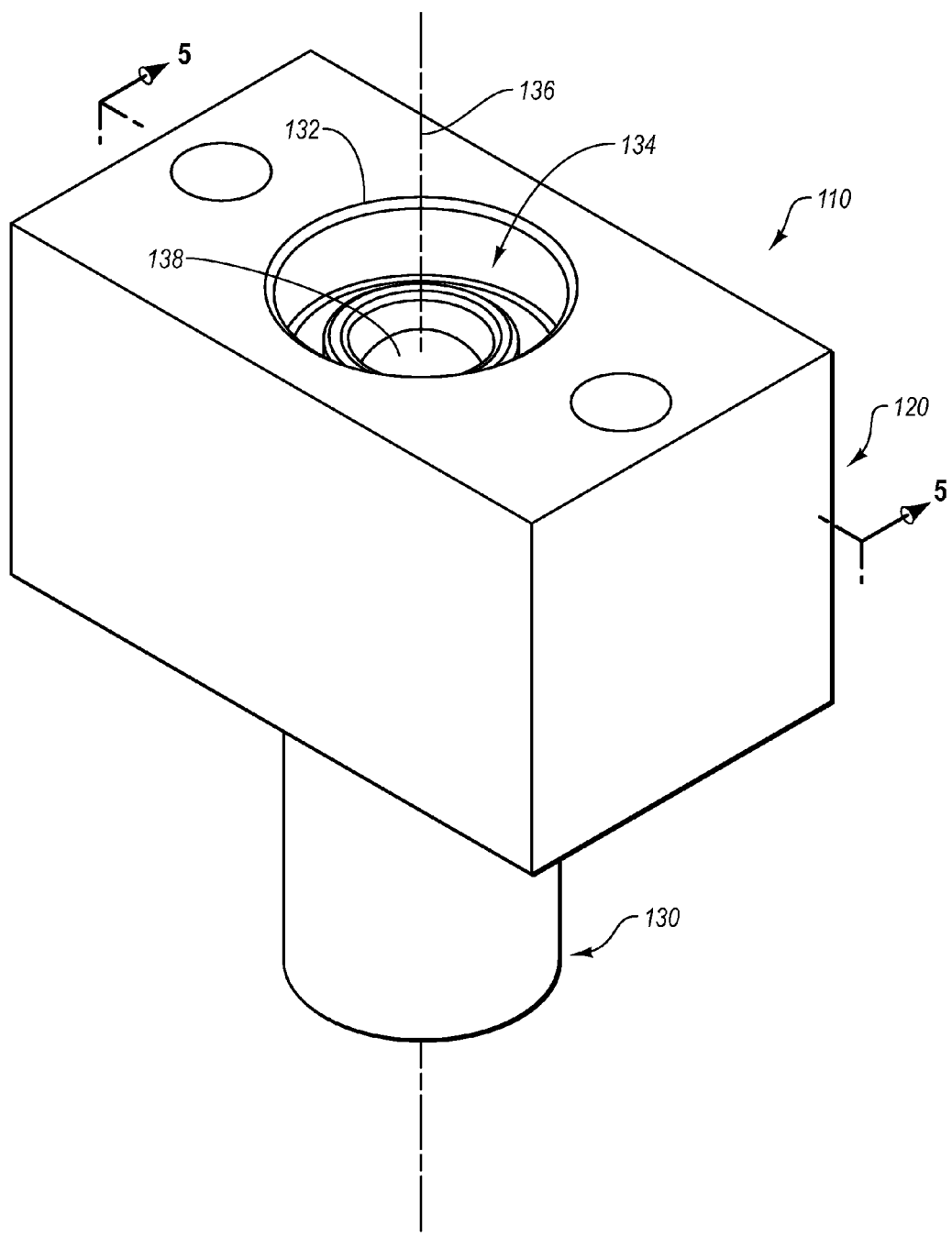
FIG. 2 is a perspective view of an optical subassembly configured in accordance with one embodiment.

In particular, FIG. 2 shows an optical subassembly, generally designated at 110. The OSA 110 as described herein can be included in the TOSA or ROSA of the transceiver 10 shown in FIG. 1 and described above, or in optical transmitters and receivers that have differing configurations from those described herein.

As shown, the OSA 110 generally includes a body 120 that is composed of a suitable low-cost material, such as aluminum, brass, soft stainless steel, zinc, plastic, or other relatively soft materials. As will be seen, the OSA body 120 can be manufactured from relatively low-cost materials without compromising performance of the OSA 110. More generally, the material from which the OSA body 120 is formed should possess some desirable characteristics, including a suitable coefficient of thermal expansion such that cracking or deformation of parts connected thereto, such as a lens or sleeve to be described below, is prevented.

Extending from the OSA body 120 is a plug receptacle 130 that is configured for receiving a connector of an optical fiber, such as the optical fiber connector 90 shown in FIG. 1. Indeed, in the embodiment shown in FIG. 1 the OSA, comprising a portion of the TOSA or ROSA, is positioned within the shell 70 and housing 80 such that the plug receptacle 130 is disposed within the interior volume defined by one of the ports 76 and in position to operably connect with the connector 90. Further details regarding the structure and function of the plug receptacle 130 will be given further below.

An opening 132 is defined on a surface of the OSA body 120 that is opposite the plug receptacle 130. The opening 132 is in communication with a cavity 134 defined in the OSA body 120, and the cavity is configured such that an optical path 136 is defined through the OSA 110 from the opening 132 through the plug receptacle 130. The optical path 136, of course, defines the path taken by optical signals passing through the OSA 110 either to or from an optical fiber connected to the plug receptacle 130.

A lens 138 is positioned in the cavity 134 such that the optical path 136 passes therethrough. The structure supporting the lens 138 will be discussed in further detail below.

Figure 3:
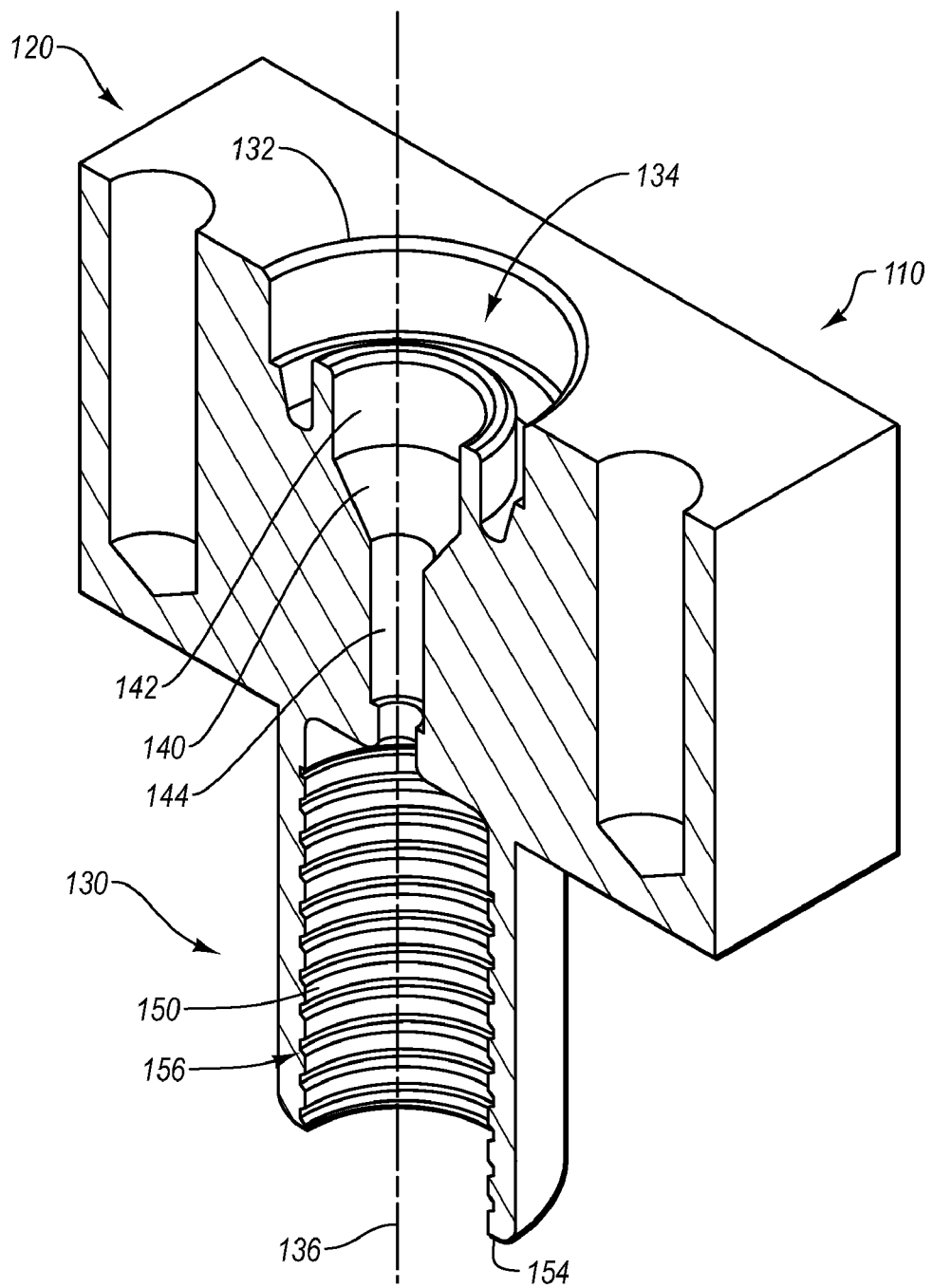
FIG. 3 is a cross sectional partial view of the optical subassembly shown in FIG. 2.

Reference is now made to FIG. 3, which shows a cross sectional view of the OSA 110, with various components removed for purposes of clarity in describing selected details of the present invention. In particular, FIG. 3 shows the optical path 136 and the structures of the OSA body 120 that provide for the path through the body. A lens cavity 140 is defined by a cavity wall 142 as part of the cavity 134 along the optical path 136 near the opening 132. The lens 138 of FIG. 2 is positioned in the lens cavity 140 during OSA assembly. Note that the lens cavity 140 can be configured in an alternative embodiment to accommodate a discrete lens mount assembly that is attached to the OSA body 120.

A passageway 144 extends between the lens cavity 140 and an interior portion of the plug receptacle 130 defined by a cylindrical inner surface 150. Again, the optical path 136 passes through the passageway 144 and the interior of the plug receptacle 130 to a receiving end 154 of the receptacle, thereby completing the optical path through the OSA body 120. The receiving end 154 of the plug receptacle 130 is so named as the connector 90 of the optical fibers 92 is received into the receptacle 130 via the receiving end when the OSA is positioned in the transceiver, optical transmitter, or optical receiver.

The inner surface 150 of the plug receptacle 130 includes surface features that are configured to assist in placing a sleeve (FIG. 4) in the receptacle, in accordance with one embodiment of the present invention. In the illustrated embodiment, the surface features are implemented as threads 156 helically defined on the inner surface 150. As will be described, the threads 156 are inversely defined on the inner surface 150 and are employed to assist the insertion of the sleeve into the plug receptacle 130, as will be described. In other embodiments, the surface features can include discrete, circular threads, knurls or knurled surfaces, or other suitable features.

Figure 4:
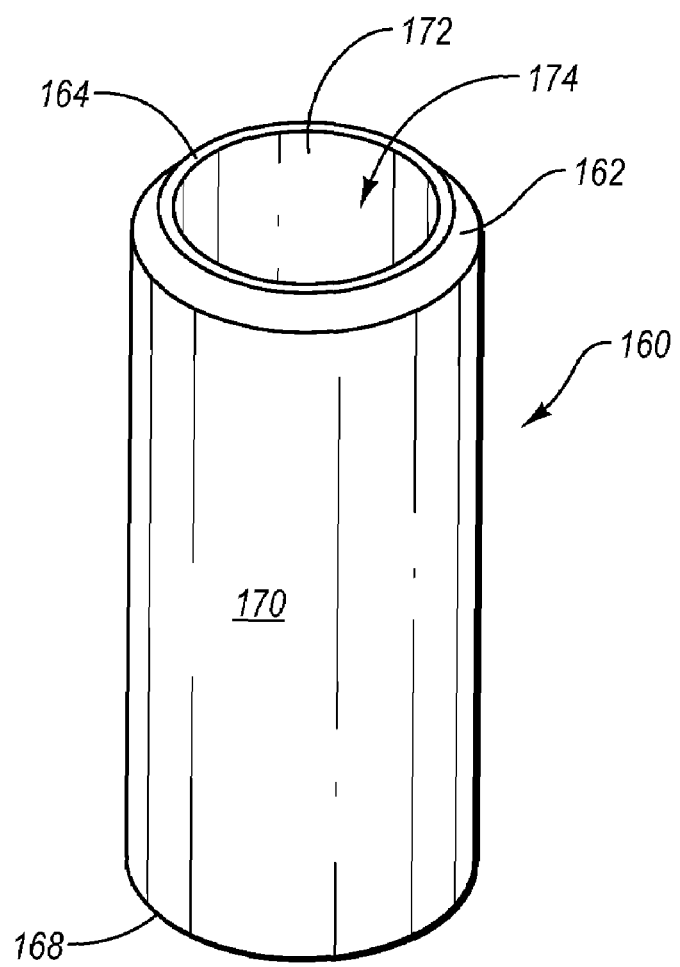
FIG. 4 is a perspective side view of a sleeve included in the optical subassembly of FIG. 2.

Reference is now made to FIG. 4, which shows various details of a sleeve 160, used in connection with the present embodiment of the present invention. In particular, the sleeve 160 is employed to define a contact surface within the plug receptacle 130 of the OSA 110 when an optical fiber connector is received therein.

Figure 6:
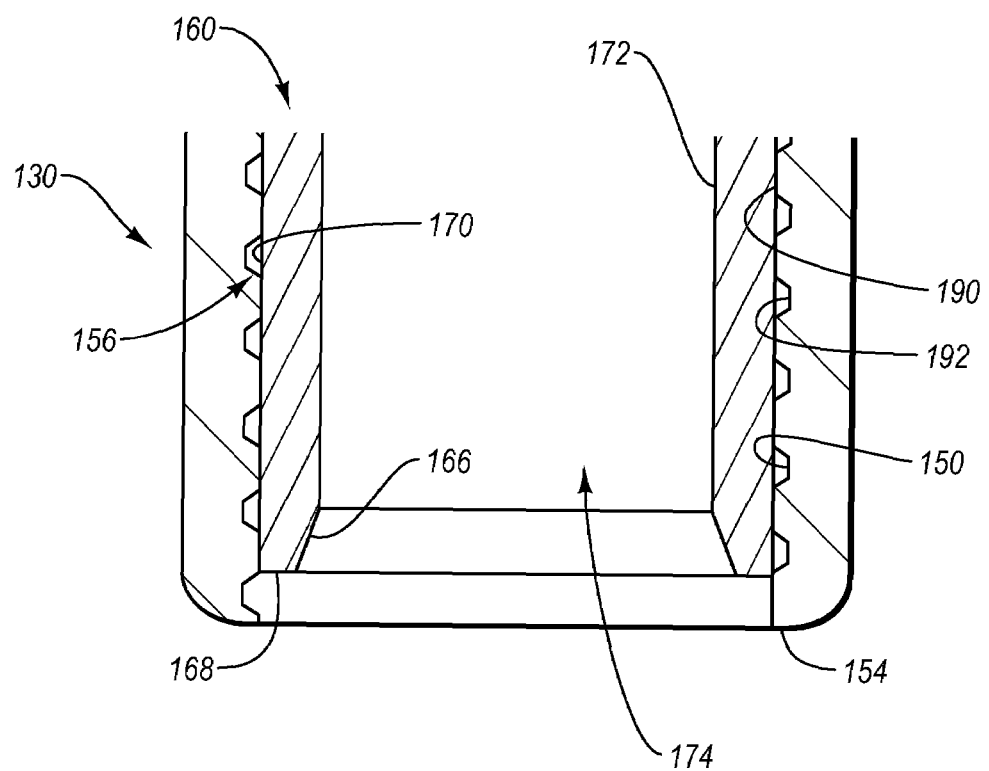
FIG. 6 is a cross sectional view of the sleeve of FIG. 4 as inserted in the optical subassembly of FIG. 2.

As shown in FIG. 4, the sleeve 160 defines a hollow, cylindrical structure and includes a chamfered surface 162 at an outer periphery of a first end 164 of the sleeve. Another chamfered surface 166, best seen in FIG. 6, is included on an inner periphery of the second end 168 of the sleeve 160. A continuous outer sleeve surface 170 extends between the sleeve first and second ends 164 and 168. Note that the outer sleeve surface 170 is not split, as in previously known designs. An inner surface 172 defines a volume 174 of the sleeve 160.

In accordance with one embodiment, the sleeve 160 is composed of a material that enables it to perform its intended function as a contact surface for the plug receptacle 130 when an optical fiber connector is received therein. In particular, the material from which the sleeve 160 is composed should be of sufficient quality as to avoid powdering or the production of shavings when the optical fiber connector is inserted and removed from the sleeve. Further, the material should be of sufficient hardness so as to prevent deformation of the sleeve upon connector insertion and removal. As used herein, "hardness" and "hard" are generally understood as referring to a measure of the resistance of a material to localized plastic deformation, and can be measured by a scale, such as the Rockwell Hardness Number. Preferably, the sleeve material is composed of the same material used to form the optical fiber plug.

In one embodiment, the sleeve 160 is composed of zirconium of sufficient quality so as to prevent the above problems. As a widely available and relatively hard material, zirconium does not deform under the connector insertion and removal actions to which the sleeve is subjected during use. Also, zirconium as incorporated into an embodiment of present sleeve fails to produce shavings in a problematic manner, in contrast to known designs. Moreover, many optical fiber plugs are composed of zirconium, which further benefits its use in the sleeve 160.

In another embodiment, a glass ceramic can be used for the sleeve 160. This serves one example of alternative materials that can be acceptably employed in the sleeve.

The sleeve volume 174 defined by the inner surface 172 has an inner diameter that is sized to correspond to the size of the optical fiber connector that is to be received within the sleeve, as part of the plug receptacle 130. Standardized connectors, such as LC, MU, SC, and FC, can be received by a respectively sized sleeve 160, as can connectors having other sizes and shape configurations. In one embodiment, for example, the sleeve 160 can be configured to receive an LC or MU connector having a round configuration of approximately 1.25 mm diameter. In another embodiment, the sleeve is configured to receive an SC or FC connector having a round configuration of approximately 2.5 mm diameter. Of course, different connector configurations, shapes, and sizes can also be accommodated.

Figure 5:
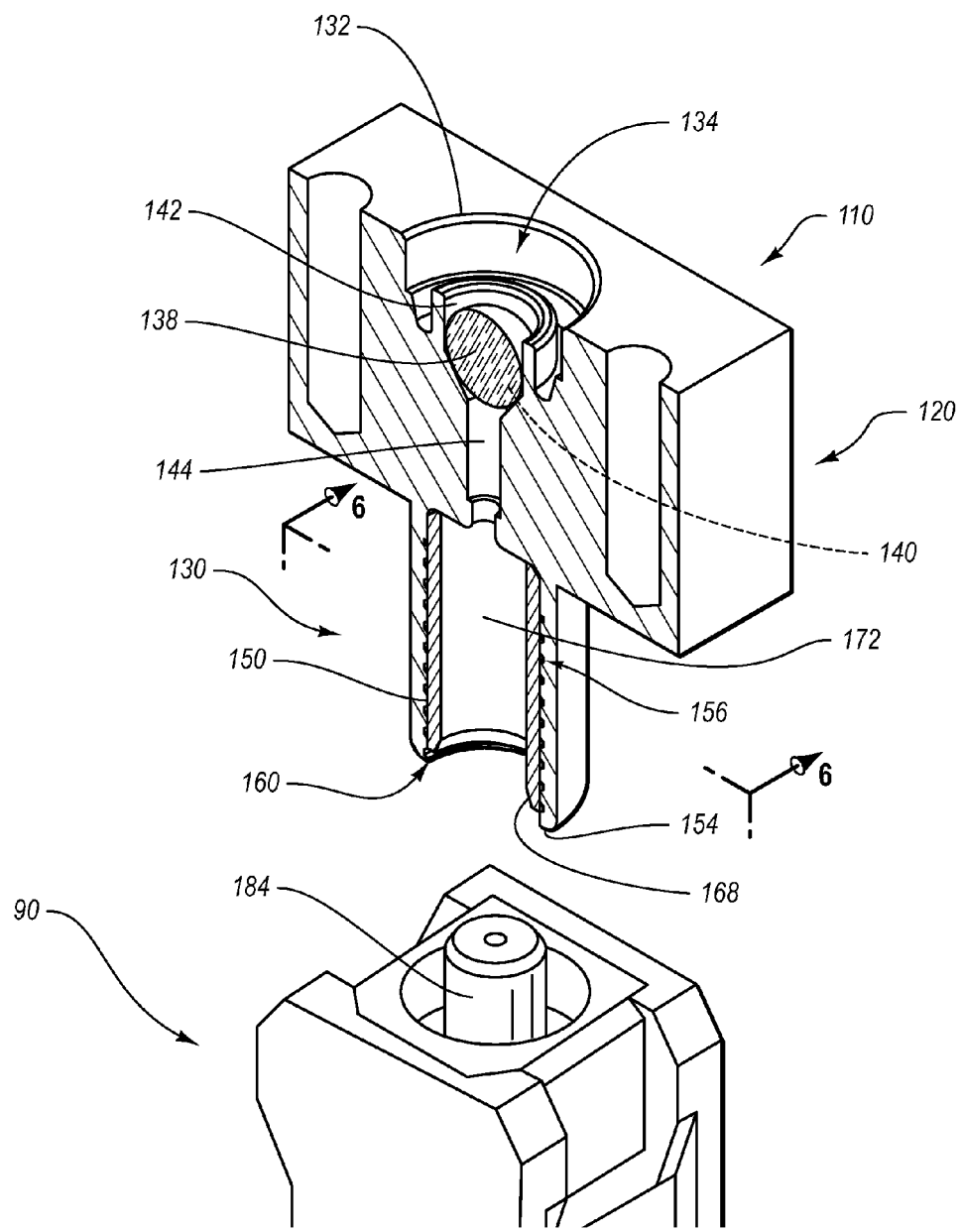
FIG. 5 is a cross sectional view of the optical subassembly shown in FIG. 2, taken along the lines 5-5.

Reference is now made to FIG. 5, which shows the OSA 110 is cross section. In particular, the sleeve 160 is shown as installed within the interior portion of the plug receptacle 130 defined by the receptacle inner surface 150. So positioned, the first end 164 of the sleeve 160 abuts the OSA body 120, while the sleeve second end 168 is positioned adjacent to the receiving end 154 of the plug receptacle 130.

The inner surface 150 of the plug receptacle 130 is sized to have an inner diameter that acceptably receives the sleeve 160 in a fixed fashion when the sleeve is installed. In preparing it for receipt of the sleeve 160, the plug receptacle is bored to define the interior receptacle portion defined by the inner surface 150. As the OSA 110 is composed of a relatively soft material, the machining, boring, or other process used to define the interior receptacle portion is performed at a relatively lower cost than what would be required in a harder material.

Surface features, such as the threads 156, are then defined on the receptacle inner surface 150 by machining or another suitable process. Further shaping and/or reaming of the surface feature-populated receptacle inner surface 150 is performed if needed so as to closely match an outer diameter of the sleeve 160 defined by the sleeve outer surface 170 with the inner diameter of the surface feature-populated inner surface.

The sleeve 160 is then inserted into the plug receptacle 130 to reside therein, as shown in FIG. 5. In one embodiment, the sleeve 160 is press fit into the plug receptacle 130. The chamfered surface 162 is used in easing insertion of the sleeve 160 past the receiving end 154 of the plug receptacle 130 and past each of the surface features of the inner surface 150. After insertion, the sleeve 160 is firmly held in place within the plug receptacle such that optical fiber connector insertion into and removal from the plug receptacle 130 does not cause undesired movement of the sleeve. Further details regarding the interference fit between the sleeve 160 and the plug receptacle 130 are given further below in connection with FIG. 6.

FIG. 5 further shows the ball lens 138 positioned in the lens cavity 140. The ball lens 138 in the present embodiment is press fit into the lens cavity 140. Because the OSA body 120, including the lens cavity wall 142, is composed of a relatively soft material, the interference fit between the ball lens 138 and the lens cavity wall is relatively forgiving, thereby easing the insertion of the lens into the lens cavity 140. The lens cavity 140 and lens cavity wall 142 can be defined in the OSA body 120 by such methods as boring, drilling, mold forming, etc. The lens 138 can also be fixed in the lens cavity 140 by an adhesive, if desired.

In other embodiments, the shape and configuration of both the lens and the lens cavity can change according to the particular needs of the application. Indeed, in one embodiment the lens mounting portion of the OSA 110, including the lens cavity, the lens cavity wall and the lens, can be a separate and discrete stricture that is attached to the OSA body. In other embodiments, such as that shown in FIG. 7, no lens mount is included in the OSA.

FIG. 5 further depicts a portion of the optical fiber connector 90, including a connected optical fiber 92 and male fiber plug end 184, which is configured for operable mating with the sleeve 160 of the plug receptacle 130. Embodiments of the present invention provide for such mating such that previously known plug/receptacle mating challenges, including hard plug, wiggle performance, and shaving problems, are avoided.

With continuing reference to the previously referenced figures, attention is now directed to FIG. 6, which shows various details of the OSA plug receptacle 130 and sleeve 160, including the interference fit defined therebetween. In particular, the receptacle inner surface 150 is shown, including the threads 156 defined thereon. In the present embodiment the threads 156, formed as a helical thread structure on the inner surface 150, define both contact surfaces 190 where the inner surface contacts the outer surface 170 of the sleeve 160, and recessed surfaces 192, where no contact between the inner surface and sleeve is made.

The above contact and recessed surface arrangement enables the sleeve 160 to be inserted in the plug receptacle 130 without the use of excessive force, by reducing the total amount of surface contact between the sleeve outer surface 170 and the receptacle inner surface 130, thereby reducing the amount of sliding force necessary for insertion and reducing stress on the sleeve. Further, the sleeve 160 is uniformly stressed during insertion, thereby preventing damage to the sleeve from uneven stressing. Thus the threads 156, together with the chamfer 162 on the sleeve first end 164, assist the sleeve insertion in an improved manner. Note that the particular configuration of the contact and recessed surfaces can vary according to the particular surface features that are defined on the plug receptacle inner surface.

In one embodiment, the sleeve can be secured within the plug receptacle with the assistance of an adhesive, if desired. In such a case, the adhesive can be included adjacent the recessed surfaces 192 to form a bond between the sleeve and the plug receptacle inner surface.

In greater detail, inclusion of the sleeve in the plug receptacle enables relatively greater precision machining to be transferred from the plug receptacle to the sleeve. In other words, relatively higher tolerance is achieved when forming the dimensions of the sleeve, while a relatively lower tolerance can be permitted when initially defining the inner dimensions of the plug receptacle, such as the inner surface 150, before the threads 156 are defined thereon. After the threads 156 are defined, further sizing of the inner portion of the plug receptacle can be performed by reaming, boring or other sizing method, if needed, to match the precision tolerances of the sleeve 160. This process equates to reduced machining and process costs when forming the OSA body 120.

As shown in FIG. 6, the chamfered surface 166 on the second end 168 of the sleeve 160 is positioned in the plug receptacle so as to assist directing the optical fiber connector into the sleeve volume 174. Also, the chamfered surface 166 and rest of the second end 168 of the sleeve 160 is exposed in its position adjacent the receiving end 154 of the plug receptacle 130, and as such will receive relatively more physical contact when the optical fiber connector is inserted into the sleeve volume 174. This is beneficial as the sleeve second end 168 is formed from a relatively harder material than the plug receptacle receiving end 154 in one embodiment and can withstand such contact without damage.

Use of the sleeve 160 in the plug receptacle 130 of the OSA 110 enables the sleeve to form the contact surface for engaging an optical fiber connector, such as the connector 90 shown in FIG. 1, when the connector is inserted into the plug receptacle. Because of the relative hardness of the sleeve 160 and its contact surface, problems with receptacle deformation or metal migration are substantially eliminated as the frictional forces associated with connector insertion and removal are imposed on the sleeve, not the softer outer material of the plug receptacle 130. This in turn substantially eliminates the challenges known in the art relating to hard plug problems. Further, because it forms a continuous hollow cylinder as opposed to a split sleeve, the sleeve 160 improves wiggle performance by restricting movement of the optical fiber connector once it is received within the sleeve volume 174. In addition, the relative hardness of the sleeve 160, especially when composed of zirconium, substantially reduces the production of shavings off of the sleeve when the optical fiber connector is inserted into and removed from the sleeve.

Note that, in other embodiments, other materials can be employed to form the sleeve included in the plug receptacle, included certain engineered plastics that meet the desired characteristics of the sleeve as discussed further above.

Figure 7:
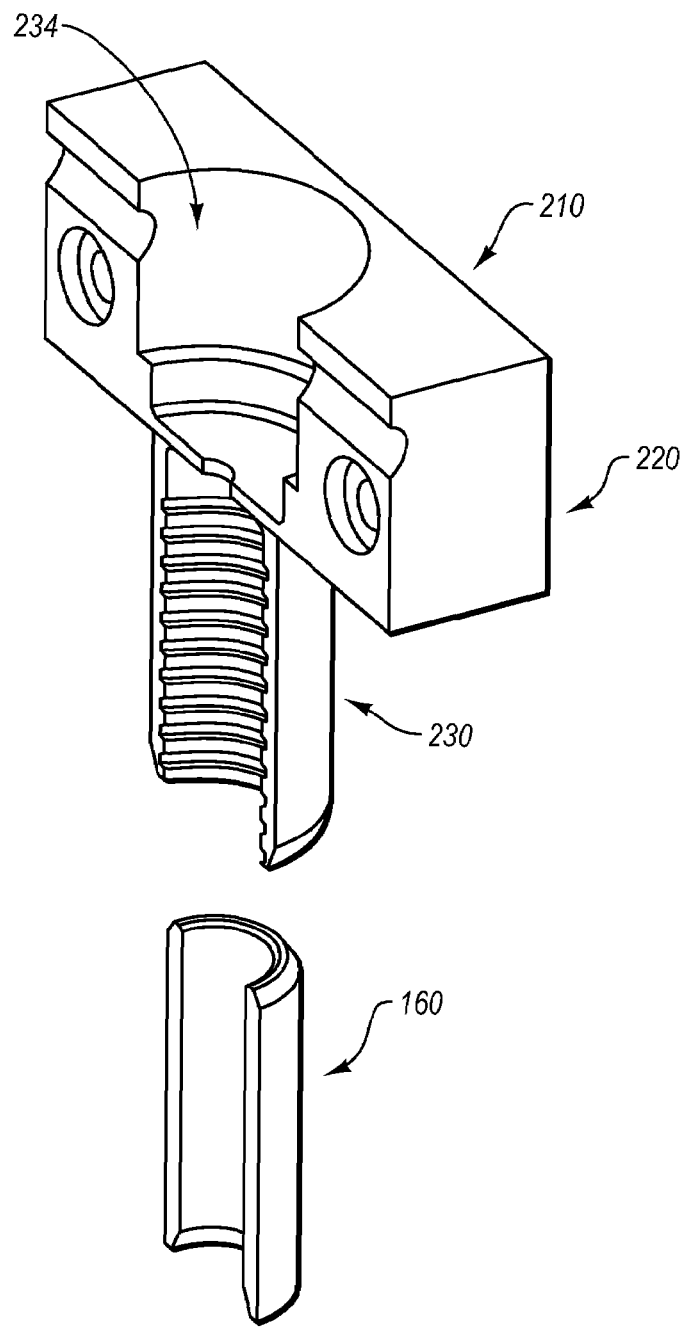
FIG. 7 is an exploded cross sectional view of an optical subassembly and a sleeve in accordance with another embodiment of the present invention.

FIG. 7 shows an optical subassembly ("OSA"), generally designated at 210, configured according to another embodiment of the present invention. The OSA 210 includes a body 220, a plug receptacle 230 and cavity 234. The sleeve 160 is configured for insertion into the plug receptacle 230, as described in connection with the previous embodiment. In contrast to the previous embodiment, however, the cavity 234 includes no integrally formed lens assembly including a lens cavity and lens cavity wall, for housing a lens. This configuration can be used if a discrete lens assembly is desired for insertion into the cavity 234, for instance, or when the lens assembly is included in another component.

In addition to the above-described advantages, i.e., resolution of hard plug issues, improved wiggle performance, and reduction of shaving production, the OSA of the embodiments described herein reduce the total number of piece parts included in the OSA, as many known designs include a discrete lens assembly and a press piece that is fitted about the split sleeve. This in turn simplifies assembly of the OSA. Further, use of the sleeve described above enables a relatively softer, cheaper material to be used for the OSA body, which further reduces material and production costs. These advantages collectively enable relatively better optical and mechanical performance of the transceiver in which the OSA is placed.

Figure 8:
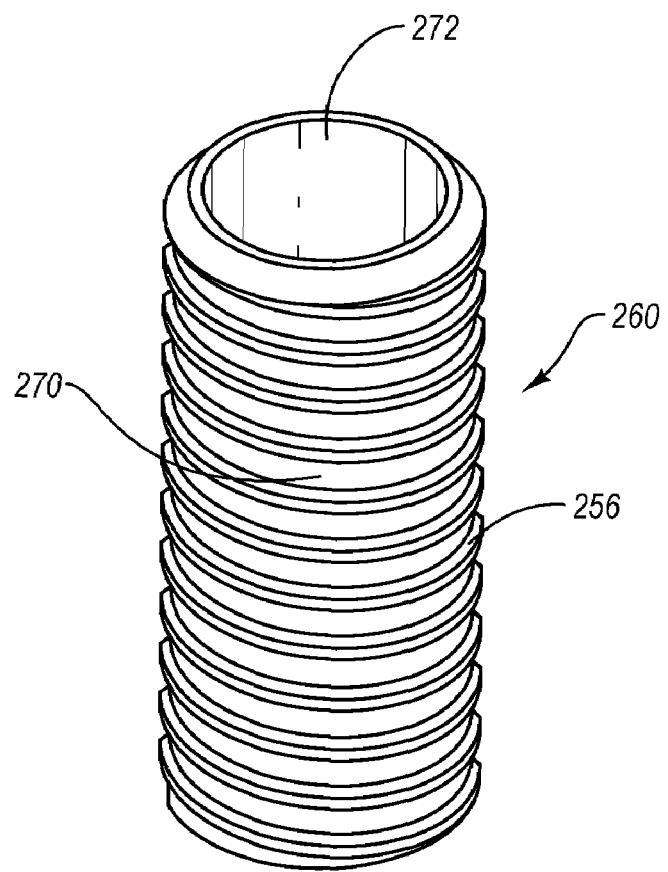
FIG. 8 is a perspective view of another embodiment of an optical sleeve.

FIG. 8 depicts various details regarding another possible sleeve configured for use with an OSA of the present invention, according to an alternative embodiment. In particular, a sleeve 260 is shown, including an outer surface 270 and an inner surface 272. The sleeve 260 further includes a plurality of threads 256 positively defined on the sleeve outer surface 270. Again, though helical threads are shown in FIG. 8, circular threads, knurls, or other suitable surfaces features can be included alone or in combination with one another on the sleeve outer surface.

The sleeve 260 can be employed in an OSA having a receptacle with a smooth inner surface, i.e., with no threads defined thereon. Defining the threads on its outer surface 270 enables the sleeve 260 to be inserted without excessive force into the smooth-surfaced receptacle in much the same way the sleeve 160 is inserted into the receptacle 130 of the OSA 110 shown in FIGS. 5 and 6. As such, it is seen that the threads can be included on either or both mating surfaces of the receptacle and sleeve while still enabling the benefits of the present invention to be realized.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical communications module, comprising:
   a housing; and
   an optical subassembly at least partially contained within the housing, the optical subassembly including:
   a body composed of a first material;
   a plug receptacle operably attached to the body and including a bore with an inner surface;
   a hollow cylindrical sleeve composed of a second material, the sleeve having an outer surface that engages the inner surface of the plug receptacle when the sleeve is received by the plug receptacle bore, the sleeve being configured to operably receive an optical fiber connector therein such that at least a portion of the optical fiber connector extends into the sleeve and into the plug receptacle bore;
   a plurality of surface features defined on at least one of the inner surface of the plug receptacle and the outer surface of the sleeve, the surface features facilitating the insertion of the sleeve into the plug receptacle; and
   wherein the hardness of the second material exceeds that of the first material.

2. The optical communications module as defined in claim 1, wherein the hardness of the second material of which the sleeve is composed is approximately equal to the hardness of the optical fiber connector.

3. The optical communications module as defined in claim 1, wherein the sleeve composed of the second material substantially fails to produce shavings when the at least a portion of the optical fiber connector is received in the sleeve.

4. The optical communications module as defined in claim 1, wherein the first material of which the body is composed is aluminum, and wherein the second material of which the sleeve is composed is zirconium.

5. The optical communications module as defined in claim 1, wherein the surface features are defined on the inner surface of the plug receptacle and the surface features define:
   contact surfaces that engage the outer surface of the sleeve; and
   recessed surfaces that do not engage the sleeve.

6. The optical communications module as defined in claim 1, wherein an adhesive is used to secure the sleeve within the plug receptacle.

7. The optical communications module as defined in claim 1, wherein the optical fiber connector is firmly held in place by the sleeve such that optical power of a light signal passing between the optical subassembly and the optical fiber connector is not substantially reduced when the optical fiber connector is wiggled.

8. The optical communications module as defined in claim 1, wherein the surface features are selected from the group consisting of circular threads, helical threads, and knurls.

9. The optical communications module as defined in claim 1, wherein the optical subassembly is a transmitter optical subassembly and wherein the optical communications module is an optical transceiver module in which the transmitter optical subassembly is positioned.

10. The optical communications module as defined in claim 1, wherein the surface features limit contact between the inner surface of the plug receptacle and the outer surface of the sleeve.

11. A method for assembling an optical subassembly, the method comprising:

defining a body and a plug receptacle that are operably connected;

defining a plurality of surface features on an inner surface of the plug receptacle; and inserting a sleeve having a continuous outer surface into the plug receptacle, the surface features of the inner surface of the plug receptacle engaging the outer surface of the sleeve and controlling the amount of sliding force required to insert the sleeve into the plug receptacle, wherein the sleeve is configured to removably receive therein at least a portion of an optical fiber connector such that, when received within the sleeve, the at least a portion of the optical fiber connector is also received within the plug receptacle; and wherein the hardness of the sleeve exceeds that of the body.

12. The method for assembling as defined in claim 11, further comprising:

sizing the inner surface of the plug receptacle having the surface features to an inner diameter that substantially matches an outer diameter of the sleeve before inserting the sleeve into the plug receptacle.

13. The method for assembling as defined in claim 11, further comprising:

applying an adhesive to the sleeve before inserting the sleeve into the plug receptacle.

14. The method for assembling as defined in claim 11, wherein inserting the sleeve further comprises:

press fitting the sleeve into the plug receptacle.

15. The method for assembling as defined in claim 11, wherein the amount of force required to press fit the sleeve into the plug receptacle is reduced as a result of the plurality of surface features on the inner surface of the plug receptacle.

* * * * *